United States Patent [19]
Norton

[11] Patent Number: 4,723,079
[45] Date of Patent: Feb. 2, 1988

[54] VEHICLE POWER SUPPLY WITH REGULATED VOLTAGE AND ADJUSTABLE VOLTAGE OUTPUTS

[76] Inventor: Peter Norton, 2730 Narraganset, Lansing, Mich. 48910

[21] Appl. No.: 844,512

[22] Filed: Mar. 27, 1986

[51] Int. Cl.$^4$ ............................................. H02J 9/00
[52] U.S. Cl. .................................. 307/66; 307/10 R
[58] Field of Search ................... 307/9, 10 R, 18, 64, 307/65, 66, 67; 322/28, 90

[56] References Cited

U.S. PATENT DOCUMENTS

| | | | |
|---|---|---|---|
| 3,668,514 | 6/1972 | Peck | 307/10 R X |
| 4,045,718 | 8/1977 | Gray | 322/90 X |
| 4,179,647 | 12/1979 | Cummins et al. | 322/90 X |

Primary Examiner—William M. Shoop, Jr.
Assistant Examiner—Richard K. Blum
Attorney, Agent, or Firm—Reising, Ethington, Barnard, Perry & Milton

[57] ABSTRACT

A plural-voltage power supply with a generator and a pair of storage batteries is disclosed for use in automotive vehicles. The two batteries are connected in series and a low voltage load circuit is connected across the lower battery and an intermediate voltage load circuit is connected across the series connection of the batteries. A high voltage load circuit is energized directly from the generator output and includes a load device adapted to be operated at a voltage corresponding to an adjustable power setting of the device. A high voltage regulator controls the generator output to provide a voltage high enough to meet the highest voltage requirement of any of the load circuits. An intermediate voltage regulator regulates the voltage across the intermediate voltage load circuit and a low voltage regulator regulates the voltage across the low voltage load circuit.

16 Claims, 2 Drawing Figures

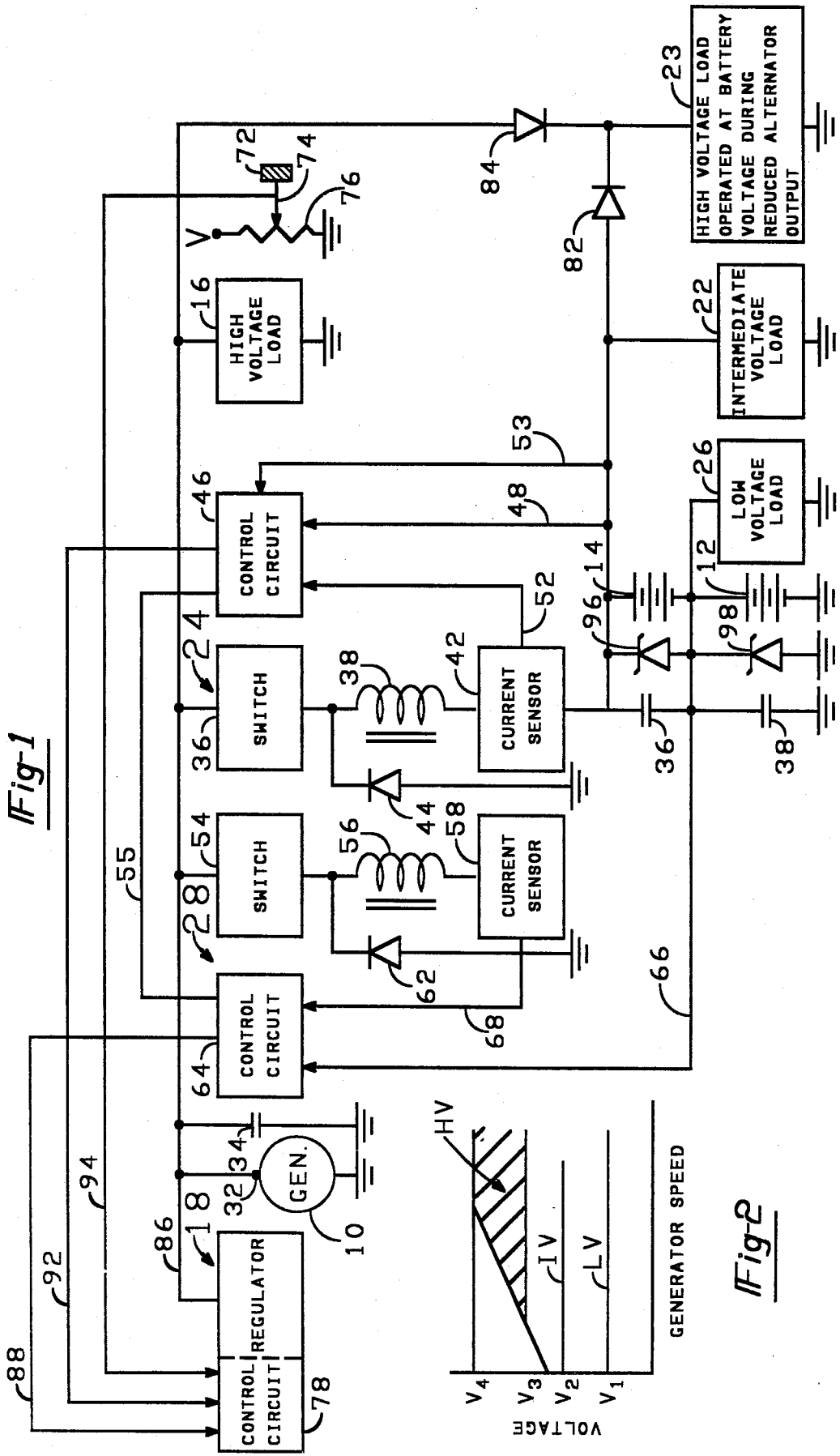

VEHICLE POWER SUPPLY WITH REGULATED VOLTAGE AND ADJUSTABLE VOLTAGE OUTPUTS

FIELD OF THE INVENTION

This invention relates to a power supply for automotive vehicles; more particularly, it relates to a generator system for providing a fixed regulated voltage output and an adjustable regulated voltage output.

BACKGROUND OF THE INVENTION

The typical electrical power supply system for automotive vehicles is a so-called constant voltage system having a nominal rated voltage of twelve volts. It comprises a single storage battery, a generator and a regulator to maintain the generator output voltage and current within certain limits. The generator, which typically takes the form of an alternator with a rectifier, is driven at variable speed by the vehicle engine and supplies DC power to the load circuits and charges the battery. The regulator is typically a switching system for the field coil of the alternator across the battery to regulate the generator output voltage to the desired value and to limit the generator current to a desired value. Dual battery systems are also known for use in automotive vehicles. Such systems are useful in vehicles which have different load devices adapted to be energized at two different voltages. For example, the system may comprise two batteries in series with a first load circuit including load devices designed to be powered at the rated voltage of one battery and a second load circuit including load devices designed to be powered at twice the rated voltage of one battery.

The electrical load on the generator of an automotive vehicle has increased with on-going changes in vehicle design and accessories. As a result, the typical low voltage system utilizing a twelve volt battery has become increasingly inefficicinet. Load devices which require high power necessarily draw heavy currents and the power losses in the generator and in the conductors are relatively high. In order to achieve a more efficient system, it is desirable to utilize load devices with a higher rated voltage. Certain load devices which require high power with large current, such as a starting motor, are preferably energized from a storage battery so it is advantageous to put two batteries in series to achieve higher output voltage. Other load devices can be operated advantageously at higher voltage and lower current and may have an adjustable power level according to the requirements on the device.

In the prior art, dual voltage systems with two batteries are known in a variety of circuit arrangements. Typically, in such systems, the load devices such as the lamps and accessories are operated at low voltage, i.e. at the rated voltage of a twelve volt battery. In some vehicle electrical systems, such as in trucks, a starter motor rated at twenty-four volts is utilized. In such systems, two twelve volt batteries are connected in series for supplying the starter motor. Various circuit arrangements are known for charging the batteries from the generator and for supplying power to the twelve volt and twenty-four volt load devices. Systems of the type utilizing two batteries to provide a dual voltage power supply are disclosed in the prior art as represented by the Seike U.S. Pat. No. 3,710,226 granted Jan. 9, 1973, Follmar U.S. Pat. No. 4,044,293 granted Aug. 23, 1977, Himmler U.S. Pat. No. 4,047,088 granted Sept. 6, 1977 and the Taylor U.S. Pat. No. 4,210,856 granted July 1, 1980. The prior art vehicle electrical systems do not provide a high voltage power supply output which is adjustable in accordance with load requirements.

My copending application Ser. No. 569,723 filed Jan. 10, 1984 entitled "DUAL VOLTAGE POWER SUPPLY SYSTEM FOR VEHICLES" provides both a regulated low voltage output and a variable high voltage output. In this dual voltage system, the low voltage output is regulated at the value required by the battery and is substantially independent of engine speed. The output of the generator which is applied to the high voltage load circuit may vary from a low voltage at idle speed of the engine to a regulated high voltage which is achieved by the generator only at higher engine speeds.

A general object of this invention is to provide a vehicle power supply with a high voltage output which is adjustable in accordance with the requirements of a load device and to overcome certain disadvantages of prior art dual voltage or plural-voltage systems.

SUMMARY OF THE INVENTION

According to this invention, an electrical power supply for an automotive vehicle is provided which affords operation at high electrical efficiency. Further, a power supply for vehicles is provided which is adapted to supply at least one low voltage load circuit at a fixed regulated voltage and to supply a high voltage load circuit at an adjustable regulated voltage having a regulated value in accordance with the requirements of a load device. Further, according to this invention, a vehicle power supply is provided in which certain non-critical load devices are automatically turned off in the event of generator failure. This is accomplished by energizing such non-critical load devices directly from the generator, excluding the system battery, so that the battery power is conserved for critical load devices such as the headlights or a power braking system. Further, according to this invention, certain load devices, for example power braking systems and power steering systems, are automatically operated at a lower voltage in the event of generator failure. This is accomplished by energizing such load devices from either the generator directly or from the battery, whichever supplies a higher voltage. Further, improved efficiency of the generator is achieved by providing a high voltage generator output which is maintained at its maximum value when the load devices require the maximum voltage or power but which is reduced when a lower voltage or power is required.

Further, according to this invention, a power supply is provided which supplies one load circuit at a fixed regulated voltage and supplies another load circuit at an adjustable regulated voltage. The invention is embodied in a vehicular electrical system which includes a storage battery and a generator, such as a conventional alternator with a full wave rectifier, which has a field winding of controlled energization. A low voltage load circuit includes the battery and a low voltage load device in parallel and adapted to be powered at a voltage in a low voltage range corresponding to the rated voltage of the battery. A high voltage load circuit includes a high voltage load device coupled with the DC voltage output of the generator and adapted to be powered at a voltage in a high voltage range extending substantially higher than the low voltage range. A low voltage regulating means is coupled with the output of the generator and the low voltage load circuit for regulating the voltage across the low voltage load circuit. Means are provided for producing a voltage demand signal corresponding to the desired voltage across the high voltage load circuit and a high voltage regulating means responsive to the voltage demand signal controls the generator to produce an output voltage corresponding to the desired voltage. Further, the low voltage regulating means preferably comprises a series switching regulator. Further, according to the invention, the system may include an intermediate voltage load circuit. A second storage battery connected in series with the first may be included in the intermediate voltage load circuit and an intermediate voltage regulating means is provided.

A more complete understanding of this invention may be obtained from the detailed description that follows taken with the accompanying drawings.

DESCRIPTION OF THE DRAWINGS

FIG. 1 is a schematic diagram of the vehicle power supply system of this invention; and FIG. 2 is a graph showing the general relationship of the system output voltages.

BEST MODE FOR CARRYING OUT THE INVENTION

Referring now to the drawings, there is shown an illustrative embodiment of the invention in a plural-voltage electrical system for automotive vehicles; it provides two different fixed regulated supply voltages and an adjustable regulated supply voltage. It will be appreciated as the description proceeds, that the invention may be implemented in different circuit arrangements and is useful in different embodiments.

As shown in FIG. 1, the power supply system of this invention comprises, in general, a generator 10 which is driven at variable speed by the vehicle engine and a pair of storage batteries 12 and 14. The generator 10 supplies output voltage directly to a high voltage load circuit 16 and is controlled by a high voltage regulator 18. An intermediate voltage load circuit 22 is connected across the series connection of lower battery 12 and upper battery 14 and is supplied with energizing voltage which is regulated by an intermediate voltage regulator 24. A low voltage load circuit 26 is connected across the lower battery 12 and is supplied with energizing voltage which is regulated by a low voltage regulator 28. A high voltage load circuit 23 is connected across the generator output through a diode 84 and is connected across the series connection of lower battery 12 and upper battery 14 through diode 82. When generator 10 is producing an output voltage greater than the voltage provided by the series connection of lower battery 12 and upper battery 14, load circuit 23 is powered through diode 84 by electricity at the higher generator output voltage. When the generator output voltage is less than the voltage produced by the series connection of lower battery 12 and upper battery 14 load circuit 23 is powered through diode 82 at the lower voltage provided by the series connection of lower battery 12 and upper battery 14. Thus in the event of generator failure load circuit 23 is powered at a lower voltage and is powered at a higher voltage when generator 10 is operating normally. The system will now be described in greater detail.

The generator 10 is suitably a conventional automotive alternator with rectifying diodes to supply a DC output voltage between ground and an output 32. The generator 10 is capable of producing a DC output voltage ranging from about thirty volts at engine idle speed to above seventy volts at high engine speed. The high voltage load circuit 16 may include high power load devices such as a heater fan and a high voltage load device such as a window heater, such load devices being adapted to operate at voltages in the range of thirty to seventy volts. The high voltage load circuit 16 will be described in greater detail subsequently. The intermediate voltage load circuit 22 includes a load device such as the starter motor which are rated for twenty-four volts. The low voltage load circuit 26 includes the conventional accessories which are rated for twelve volts such as the lamps and horns.

The supply voltages provided by the plural-voltage power supply of this invention are represented graphically in FIG. 2. The low voltage output represented by the graph LV has a regulated value V1 corresponding to the rated voltage of the lower battery 12. The intermediate voltage output represented by the graph IV, has a regulated value V2 corresponding to the sum of the rated voltages of lower battery 12 and upper battery 14. Both the low voltage output LV and the intermediate voltage output IV are substantially independent of generator speed. The high voltage output is represented in FIG. 2 by the graph line and shaded region HV. This voltage output is regulated at an adjustable value in the voltage range from V3 to V4 when the speed of the alternator is sufficient to enable that value of voltage to be generated.

The high voltage regulator 18 is a generator field current regulator of well known type. The regulator 18 is coupled with the field winding of the generator 10 and is adapted to control the energization of the field winding to maintain the generator output at a set regulated voltage. The regulator 18 is suitably of the type disclosed in my copending application Ser. No. 569,723 filed Jan. 10, 1984 entitled "DUAL VOLTAGE POWER SUPPLY SYSTEM FOR VEHICLES". Many regulators are known for controlling the output of a conventional automotive generator and may be used in place of regulator 18. Regulator 18 will be described further after the description of the regulators 24 and 28.

A storage capacitor 34 is connected between the output 32 of the generator 10 and ground. A storage capacitor 38 and protective device 98, such as zener diode, are connected across the lower battery 12 and a storage capacitor 36 and protective device 96, such as a zener diode, are connected across the upper battery 14. The purpose of these capacitors and protective devices will be described subsequently.

The intermediate voltage regulator 24 is suitably of the series switching type disclosed in my copending application Ser. No. 569,723 identified above. It comprises, in general, a solid state switch 36 and an inductor 38 connected in series with a current sensor 42 between the output 32 of the generator and the upper terminal of the upper battery 14. A diode 44 is connected between the upper terminal of the inductor 38 and ground. The switch 36 is controlled by a control circuit 46 to operate with a duty cycle which is effective to regulate the voltage across the intermediate voltage load circuit at the intermediate voltage value and to limit the current to a predetermined value. For this purpose, the control circuit 46 receives a voltage control signal on a conductor 48 which is connected with the upper terminal of battery 14 and it receives a current control signal on a conductor 52 which is connected with the current sensor 42. For a purpose to be described subsequently, the control circuit 46 also receives another voltage control signal on a conductor 53 which is connected with the upper terminal of the battery 12.

The low voltage regulator 28 is also a series switching regulator and is suitably the same type as the intermediate voltage regulator 24. Regulator 28 comprises, in general, a solid state switch 54 and an inductor 56 connected in series with a current sensor 58 between the output 32 of the generator 10 and the lower battery 12. A diode 62 is connected between the upper terminal of the inductor 56 and ground. The switch 54 is controlled by a control circuit 64 to operate with a duty cycle which is effective to regulate the voltage across the low voltage load circuit 26 to a voltage corresponding to the rated voltage of the lower battery 12 and to limit the current to a predetermined value. For this purpose, the control circuit 64 receives a voltage control signal on a conductor 66 which is connected with the upper terminal of the battery 12 and it receives a current control signal on a conductor 68 which is connected with the current sensor 58. Control circuits 46 and 64 are connected together by a conductor 55 and include phase control means for causing the switches 36 and 54 to operate out of phase with each other so that both are not unnecessarily closed at the same time.

As discussed above, the power supply system is adapted to supply a regulated low voltage to the low voltage load circuit 26, a regulated intermediate voltage to the intermediate voltage load circuit 22 and a regulated high voltage at an adjustable value to the high voltage load circuits 16 and 23. In order to achieve high operating efficiency, the system is adapted to regulate the generator to produce an output voltage at output 32 which is required to supply the voltage requirement of any load device which is connected to one of the supply lines, i.e. in the low voltage load circuit 26, the intermediate voltage load circuit 22 or the high voltage load circuits 16 or 23. If there is demand for power from the intermediate voltage load circuit 22 but not from the high voltage load circuits 16 or 23, the generator output will be regulated to supply the intermediate voltage through regulator 24 as required. The high voltage load circuit 16 includes a load device, namely an electric window heater, which is operable at an adjustable power level to adjust the amount of heating. The heater may be set to an adjustable heating level by a manual control knob 72 through a shaft 74. A potentiometer 76 has its movable contact coupled with the shaft 74 and develops a voltage command signal corresponding to the voltage demanded for the high voltage load circuit. (An automatic control for the window heater and load 23 may be provided which develops a voltage command signal.)

For the purpose of setting the high voltage regulator 18 to regulate in accordance with the highest voltage demand, it is provided with a regulator control circuit 78. The regulator 18 is supplied with voltage from the alternator 10 through a conductor 86. A low voltage demand signal is coupled with the control circuit 78 through a conductor 88 from the control circuit 64. An intermediate voltage demand signal is coupled to the control circuit 78 through a conductor 92 from the control circuit 46. The high voltage demand signal is coupled through a conductor 94 with the control circuit 78 from the movable contact of the potentiometer 76. The control circuit 78 is responsive to the combination of the demand signals to set the regulator 18 so that it regulates the generator output at a voltage satisfying all load circuits.

In operation of the system, the generator 10 is regulated by the high voltage regulator 18 to supply the highest voltage demanded by the load circuits. If a load device is turned on in all of the load circuits 26, 22 and 16, the respective regulators 28, 24 and 18 will all be operative. The storage capacitor 34 is adapted to store a charge during the time interval when the voltage thereacross increases and to discharge when it decreases. The switches 36 and 54 are operated out of phase with each other to minimize the charge storage and current requirements imposed upon storage capacitor 34. The capacitor 34 coacts with each of the regulators 24 and 28 to enable each to function in the manner of a DC-to-DC converter with higher current output and reduced voltage. Capacitor 38 across the lower battery 12 is effective to protect against momentary overvoltage which may result from reduced demand by the low voltage load 26 and the consequent inductive voltage transient across the inductor 56. Capacitor 36 in series with capacitor 38 provides for momentary overvoltage protection across the intermediate voltage load 22. In the event that a load device is turned on in the intermediate voltage load circuit 22 but none is turned on in the high voltage load circuits 16 or 23, the generator 10 will be regulated at a voltage sufficient to meet the requirements of regulator 24 in response to the intermediate voltage demand signal which is applied to the control circuit 78. However, if the voltage across the low voltage load circuit exceeds a predetermined limit, e.g. fifteen volts for a 12 volt battery, control circuit 46 turns switch 36 off to protect the low voltage circuit. This could happen, for instance, if battery 14 became shorted. If the high voltage load device, i.e. the electric window heater, is turned on in the high voltage circuit 16, the generator 10 will be regulated by regulator 18 to produce an output voltage in the high voltage range HV. The high voltage regulator 18 will be set by the control circuit 78 to regulate at a voltage corresponding to the voltage demand signal according to the power setting of the potentiometer 76. This voltage demand signal is applied through conductor 94 to the control circuit 78.

Zener diodes 96 and 98 or other protective devices may be provided to assist or replace capacitors 36 and 38 in protecting against momentary voltage transients. Capacitors 36 and 38 and protective devices 96 and 98 are particularly required to protect load circuits 22 and 26 in the event of open connections to batteries 12 or 14.

Although the description of this invention has been given with reference to a particular embodiment, it is not to be construed in a limiting sense. Many variations and modifications will now occur to those skilled in the art. For a definition of the invention reference is made to the appended claims.

What is claimed is:

1. An electrical system for a vehicle, said system comprising:
    a DC generator having at least one DC output,
    a first load circuit including a first battery and a first load device and adapted to be powered by DC electricity at a voltage in a first voltage range corresponding to the rated voltage of the first battery,
    a second load circuit including a second load device coupled with a DC output of said DC generator and adapted to be powered by DC electricity at a voltage in a second voltage range extending substantially higher than said first voltage range, first regulating means having an input coupled with a DC output of said DC generator and having an output coupled with said first load circuit for regulating the voltage across the first load circuit, said first regulating means including means for converting power received at said input to power meeting the requirements of said first load circuit, signal producing means for producing a voltage demand signal corresponding to a desired voltage across the second load circuit, and second regulating means responsive to said signal for controlling said generator to produce a DC voltage corresponding to said desired voltage.

2. The invention as defined in claim 1 wherein:
said second load device is adapted to be operated at a maximum rated voltage and at voltages substantially less than said maximum rated voltage,
and wherein said second regulating means is adapted to control said generator to produce said maximum rated voltage and lower voltages.

3. The invention as defined in claim 2 wherein:
said generator is adapted to be driven at a variable speed up to a maximum speed,
and said second regulating means is adapted to control said generator to produce said maximum rated voltage when said generator is driven at speeds approximating said maximum speed when said maximum rated voltage is desired.

4. The invention as defined in claim 1 wherein:
said first regulating means comprises a first switching means and a first inductor connected in series with said first load circuit,
a first unidirectional conductive means connected in parallel with the series combination of said first inductor and said first load circuit,
and control means for controlling said first switching means.

5. The invention as defined in claim 1 including a third load circuit,
said third load circuit including a second battery connected in series with said first battery and a third load device connected across said series connected batteries, said third load device being adapted to be powered by electricity at a voltage in a third voltage range corresponding to the rated voltage of the combination of said batteries connected in series,
and third regulating means having an input coupled with a DC output of said DC generator and having an output coupled with said third load circuit for regulating the voltage across the third load circuit.

6. The invention as defined in claim 5 wherein:
said third regulating means comprises second switching means and a second inductor connected in series with said third load circuit, a second unidirectional conductive means connected in parallel with the series combination of said inductor and said third load circuit,
and control means for controlling said second switching means.

7. The invention as defined in claim 1 including means for controlling said second regulating means so that the voltage at a DC output of said DC generator is sufficient to meet the requirements of both of said load circuits.

8. The invention as defined in claim 5 including means for controlling said second regulating means so that the voltage at a DC output of said DC generator is sufficient to meet the requirements of all of said load circuits.

9. The invention as defined in claim 1 including overvoltage protective means coupled with said first load circuit.

10. The invention as defined in claim 9 wherein said protective means comprises at least one capacitor.

11. The invention as defined in claim 5 including overvoltage protective means coupled with said first and third load circuits.

12. The invention as defined in claim 11 wherein said protective means includes at least one capacitor.

13. The invention as defined in claim 6 wherein,
said first regulating means comprises a first switching means and a first inductor connected in series with said first load circuit,
a first unidirectional conductive means connected in parallel with the series combination of said first inductor and said first load circuit,
and means for urging said first and second switching means to operate out of phase with each other.

14. The invention as defined in claim 6 including means for turning off said second switching means during overvoltage at said first load circuit.

15. An electrical system for a vehicle, said system comprising:
a DC generator having at least one DC output,
a load circuit including a battery means and a first load device and adapted to be powered by DC electricity at a voltage in a first voltage range corresponding to the rated voltage of the battery means,
a second load circuit including a second load device coupled with a DC output of said DC generator and adapted to be powered by DC electricity at a voltage in a second voltage range extending substantially higher than said first voltage range,
first regulating means having an input coupled with a DC output of said DC generator and having an output coupled with said first load circuit for regulating the voltage across the first load circuit, said first regulating means including means for converting power received at said input to power meeting the requirements of said first load circuit,
signal producing means for producing a voltage demand signal corresponding to a desired voltage across the second load circuit,
second regulating means responsive to said signal for controlling said generator to produce a DC voltage corresponding to said desired voltage,
an additional load circuit including an additional device,
and means for connecting said additional load circuit to a DC output of said DC generator or to said battery means whichever delivers a higher voltage.

16. The invention as defined in claim 15 wherein said means for connecting comprises a pair of steering diodes.

* * * * *